United States Patent Office 3,476,781
Patented Nov. 4, 1969

3,476,781
3-KETO-Δ$^{1,4}$-, 3-KETO-Δ$^{4,6}$- OR 3-KETO-Δ$^{1,4,6}$-19-ALKYLIDENE STEROIDS
Andor Fürst and Ernst Gerhard Herzog, Basel, Switzerland, assignors to Hoffmann-La Roche Inc., Nutley, N.J., a corporation of New Jersey
No Drawing. Filed Apr. 7, 1967, Ser. No. 629,098
Claims priority, application Switzerland, Apr. 20, 1966, 5,739/66
Int. Cl. C07c *169/22, 167/14;* A61k *27/00*
U.S. Cl. 260—397.3
15 Claims

ABSTRACT OF THE DISCLOSURE 3-keto-Δ$^{1,4}$-keto-Δ$^{4,6}$- or 3 - keto-Δ$^{1,4,6}$-19-alkylidene-steroids are prepared via dehydrogenation of 3-keto-Δ$^4$-19-alkylidene-steroids. The products are useful gonadotrophin inhibitors.

BACKGROUND OF THE INVENTION

In 1964 Bachmann et al. J.A.C.S. 63, 2592 (1941), described the synthesis of 13-n-propyl-equilenin and the physiological activity of this unnatural steroid. For over twenty years, no note was taken of this finding and it remained a mere curiosity in the field of steroids. In 1961, publications of several different groups appeared relating to variations at the 13-position of the steroid molecule: Velluz et al., Tetrahedron Letters 1961, 127; U.S. Patent 3,075,970; Belgian Patent 660,827; Smith et al., Experientia 19, 394 (1963); Belgian Patent 653,350; Netherlands Patent 6,403,634; Netherlands Patent 6,409,391; Smith et al., J. Chem. Soc. (London) 1963, 5072; Smith et al., J. Chem. Soc. (London) 1964, 4472; Turnbull et al., Tetrahedron Letters 1966, 801; Belgian Patent 662,-951; and Baddeley et al., J. Org. Chem. 31, 1026 (1966). There also appeared work relating to the synthesis of aldoestrone [Heusler et al., Experientia 16, 24 (1960); Barner et al., Helv. Chim. Acta. 44, 502 (1961); Velluz et al., Compt. rendus Acad. Sciences 250, 725 (1960); Barton et al., J.A.C.S. 82, 2641 (1960); Barton et al., J.A.C.S. 83, 4083 (1961); and Wolff et al., J.A.C.S. 82, 4118 (1960)] and the preparation of 18-cyanoprogesterone [Nussbaum et al., J.A.C.S. 82, 2973 (1963)].
Ehrenstein [J. Org. Chem. 9, 435 (1944) and Ehrenstein et al., Science 100, 251 (1944)] has shown in 1944 that 19-nor-progesterone is active, and Djerassi and others [Djerassi et al., J.A.C.S. 76, 4092 (1954) and Zaffaroni et al., J.A.C.S. 76, 6211 (1954)] synthesized 17α-ethinyl-19-nor-testosterone. Other workers have subsequently varied the 10-substituent of the steroid molecule: Nomine et al., Compt. rendus Acad. Sciences 254, 1823 (1962); Belgian Patent 889,098; U.S. Patent 3,141,025; U.S. Patent 3,132,138; Kincl et al., Steroids 3, 109 (1964) ; Halpern et al., J. Org. Chem. 31, 693 (1966); Knox et al., J. Org. Chem. 30, 2198 (1965); U.S. Patent 3,213,085; U.S. Patent 3,218,316; U.S. Patent 3,207,767; U.S. Patent 3,102,127; Halpern et al., Chem. Ind. 1963, 116; Jen et al., J. Med. Pharm. Chem. 5, 876 (1962); Jen et al., J. Org. Chem. 28, 1573 (1963); and U.S. Patent 3,127,427.
The present invention realtes to compounds having a 19-alkylidene group, a 3-keto-Δ$^4$-configuration and at least one additional unsaturation in the A- or B-ring. These compounds, described in more detail below, have been found to have unique physiological properties with a separation of properties not previously known to be resident in the steroid molecule.

DETAILED DESCRIPTION

This invention realtes to compounds of the formula:

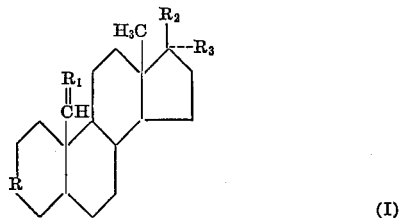
(I)

wherein R is a 3-keto-Δ$^{1,4}$-, 3-keto-Δ$^{4,6}$- or 3-keto-Δ$^{1,4,6}$- system; $R_1$ is lower alkylidene; $R_2$ is hydroxy, a hydrocarbon carboxylic acyloxy group of less than 10 carbon atoms, lower alkoxy, or tetrahydropyranyloxy; $R_3$ is hydrogen, lower alkyl, lower alkenyl or lower alkynyl; or $R_2$ and $R_3$ together are oxo.

As used in this description, the term "lower alkyl" comprehends staright or branched chain hydrocarbon moieties of up to 6 carbon atoms such as methyl, ethyl, propyl, isopropyl, butyl, isobutyl, and t-butyl. Similarly, the term "lower alkylidene" comprehends moieties such as methylidene (i.e., methylene), ethylidene, propylidene, isopropylidene, butylidene, isobutylidene, and t-butylidene. "Lower alkenyl" comprehends, for example, vinyl, allyl, or methallyl. "Lower alkynyl" comprehends, for example, ethynyl or propargyl. A hydrocarbon carboxylic acyloxy group of less than 10 carbon atoms is one derived from a saturated or unsaturated aliphatic or aromatic carboxylic acid with 1 to 10 carbon atoms. Examples of such acids are acetic acid, propionic acid, caproic acid, pivalic acid, butyric acid, isobutyric acid and benzoic acid. "Lower alkoxy" comprehends alkoxy groups containing a lower alkyl moiety, for example, methoxy or t-butoxy.

The compounds of Formula I can be prepared via dehydrogenation of a 3-keto-Δ$^4$-19-alkylidene-steroid of the formula:

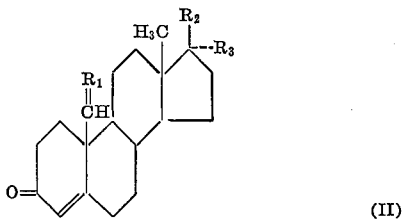
(II)

wherein $R_1$, $R_2$, and $R_3$ have the same meaning as above.
Dehydrogenation of a compound of Formula II so as to obtain a compound of Formula I can be effetced via known methods utilizing known dehydrogenation agents, for example, benzoquinone derivatives, such as dichlorodicyanobenzoquinone or chloranil. These dehydrogenations can be effected in the presence of inert organic solvents, for example, hydrocarbons such as benzene; ethers such as dioxane; or lower alkanols such as amyl alcohol or the like.

The introduction of a double bond into the 1(2)-position (i.e., for the preparation of 3-keto-Δ$^{1,4}$-compounds of Formula I) is effected by reacting a compound of Formula II with a benzoquinone derivative in the presence of small amounts of mineral acid. For example, the amount of mineral acid used should be less than 1 percent on a volume basis of the solvent used, preferably 0.1 to 1 percent. The introduction of a 6(7)-double bond (i.e., for the preparation of 3-keto-Δ$^{4,6}$-compounds of Formula I) is effected by reacting a compound of Formula II with the benzoquinone derivative in the presence of more than 1 percent, preferably 1 to 10 percent, of mineral acid. Hydrochloric acid is advantageously used as the mineral acid in the above dehydrogenation reactions.

In a different procedure, a 1(2)-double bond can be introduced according to known methods via bromination and subsequent dehydrobromination. The bromination can, for example, be effected via use of bromine or with n-bromosuccinimide and the dehydrobromination can, for example, be effected with bases such as lithium carbonate/lithium bromide in dimethylformamide Compounds of Formula I wherein R is a 3-keto-$\Delta^{1,4,6}$-system can be obtained by successive dehydrogenations in the 1(2)- and 6(7)-positions. These successive dehydrogenations can be carried out in either sequence. However, when dehydrogenation is effected by means of a benzoquinone derivative as described above, the 3-keto-$\Delta^{1,4,6}$-compounds of Formula I are directly obtained in small amounts as well as the principally formed compounds having the 3-keto-$\Delta^{1,4}$- or 3-keto-$\Delta^{4,6}$-configuration. When a compound of Formula II wherein $R_2$ and $R_3$ together are oxo or $R_2$ is hydroxy and $R_3$ is hydrogen is used as the starting material, then before or after the introduction of the additional double bond is effected, the 17-keto-group can be reduced to a 17$\beta$-hydroxy-group or, after first protecting the 3-keto-group, can be converted into a secondary alcohol group by reaction with a Grignard compound or an organic alkali metal compound.

The reduction of the 17-keto group to the 17$\beta$-hydroxy-group can be effected in a known manner, for example, by means of complex metal hydrides such as lithium aluminum hydride.

The 17-keto-group can be converted into a secondary alcohol group in a known manner using reactants such as lower alkyl, lower alkenyl or lower alkynyl magnesium halides such as methyl, ethyl, propyl, isopropyl, vinyl, ethynyl magnesium iodide (or the chloride or bromide). As the organic metallic compound, there can be used, for example, methyl-, ethyl-, or butyl-lithium or sodium-, potassium- or lithium-acetylide or the like. Prior to conversion of the 17-keto-group into a secondary alcohol group, it is necessary to selectively protect the 3-keto-group. This can be done in a known manner, for example, by enol etherification with a dialkoxypropane such as dimethoxypropane in the presence of p-toluenesulfonic acid. The starting materials of Formula II can be prepared by known methods, certain of which are illustrated in the working examples of this specification.

Compounds of Formula I are useful as gonadotrophin inhibitors. They are characterized by a unique separation of endocrinological properties. Thus, for example, 19-ethylidene - 17$\alpha$ - ethynyl-17$\beta$-hydroxy-androsta-1,4-dien - 3 - one and 19-ethylidene-17$\alpha$-methyl-17$\beta$-hydroxy-androsta-1,4-dien-3-one strongly or completely inhibit growth of the prostate in intact juvenile male rats, but in contrast to classical estrogens, they depress the growth of the seminal vesicles. The compounds of Formula I can be used as pharmaceuticals, for example, for the treatment of prostatic hypertrophy or as contraceptives.

The compounds of Formula I can be administered with dosage adjusted to individual needs. Dosages can be given as a single unit dosage form or in divided dosage units. For oral administration, dosage units containing from about 0.01 mg. to about 5 mg. of the compound of Formula I can be used. For parenteral administration dosage units containing from about 0.01 mg. to about 5 mg. of the compound of Formula I can be used. Daily dosages of from about 0.0002 mg./kg. of body weight to about 0.1 mg./kg. of body weight can be used when the compound of Formula I is administered orally, and when administered parenterally, daily dosages of from about 0.0002 mg./kg. to about 0.1 mg./kg. can be used. These dosage figures are in no way critical and should, of course, be adjusted according to the best judgment of the person administering the compound in accord with the needs of the subject receiving the compound and the reason for which the compound is being administered.

The compounds of Formula I can be administered enterally for example, orally or parenterally, in the form of conventional pharmaceutical preparations which contain them in admixture with conventional pharmaceutical organic or inorganic inert carrier materials suitable for enteral or parenteral application such as, for example, water, gelatin, lactose, starch, magnesium stearate, talc, vegetable oils, gums, polyalkyleneglycols, Vaseline, etc. The pharmaceutical preparations can be in solid form such as tablets, dragees, suppositories, capsules, or in liquid form such as solutions, suspensions, or emulsions. They may be sterilized and/or contain additives such as preserving, stabilizing, wetting, or emulsifying agents, salts for varying the osmotic pressure or buffers. They can also contain yet other therapeutically valuable substances.

Of those compounds of Formula I, those of the following formula have been found to be particularly active as gonadotrophin inhibitors:

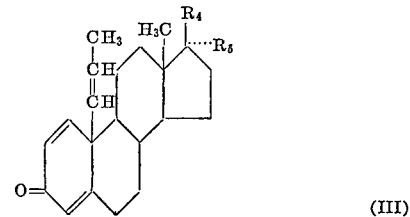

(III)

wherein $R_4$ is hydroxy; $R_5$ is lower alkyl, lower alkenyl or lower alkynyl; or $R_4$ and $R_5$ together are oxo.

The following examples are illustrative of this invention but not limitative thereof. All temperatures are stated in degrees centigrade.

EXAMPLE 1

A solution of 3.12 g. of 19-ethylidene-androst-4-ene-3,17-dione and 2.76 g. of dichlorodicyanobenzoquinone in 250 ml. of dioxane which contains 0.13 percent of concentrated hydrochloric acid is stirred at room temperature under a nitrogen atmosphere for 24 hours. The reaction mixture is then poured on ice water, and extracted with ether. The extract is washed with hydrogen carbonate solution and brine, dried and evaporated. The residue is chromatographed on the 1200-fold amount of silica gel using chloroform. The so-obtained 19-ethylidene-androsta-1,4-diene-3,17-dione is recrystallized from ether or ether/petroleum ether (low boiling) and forms crystals melting at 177–179°.

The starting material can be prepared as follows:
A solution of 4.15 g. of 19-ethylidene-androst-5-ene-3$\beta$,17$\beta$-diol in 400 ml. of acetone is cooled to 0° and there is then added in one portion 10.35 ml. of a solution which contains 13.36 g. of chromium trioxide and 11.5 ml. of concentrated sulfuric acid and sufficient water to make 50 ml. of solution. Six minutes after the addition of this solution, 60 ml. of methanol is added to the reaction mixture which is then evaporated to dryness. The residue is extracted with ether and the ethereal solution is washed, dried and evaporated.

The so-formed crude mixture is dissolved in benzene and evaporated to dryness a few times with the addition of an about 17-fold amount of aluminum oxide. This mixture, as a suspension in petroleum ether (high boiling), is then poured on a petroleum ether-moistured aluminum oxide column and allowed to stand overnight. By elution with petroleum ether/benzene (5:4) and benzene there is obtained 19-ethylidene-androst-4-ene-3,17-dione which upon crystallization from ether/petroleum ether, melts at 135–136°.

EXAMPLE 2

A solution of 2.5 g. of 19-ethylidene-androst-4-en-3-on-17β-ol and 2.15 g. of dichlorodicyanobenzoquinone in 201 ml. of dioxane which contains 0.13 percent of concentrated hydrochloric acid is stirred at room temperature under a nitrogen atmosphere for 24 hours. The reaction mixture is then poured on ice water and extracted with ether. The ethereal solution is washed with sodium hydroxide solution and water, dried and evaporated. By chromatography on 1200-fold amount of silica gel, there is obtained 19-ethylidene-androsta-1,4-dien-3-on-17β-ol melting at 181–182° upon crystallization from ether.

The starting material can be prepared as follows:

Lithium aluminum tri(tertiary-butoxy)hydride is prepared from 76 mg. of lithium aluminum hydride and 444 mg. of tert-butyl alcohol in tetrahydrofuran [see Coll. Czech. Chem. Comm. 1959, 24, 2284].

To this suspension there is added dropwise at 2–3° a solution of 200 mg. of 19-ethylidene-androst-4-ene-3,17-dione in 5 ml. of tetrahydrofuran. After stirring at room temperature for 4 hours, excess reagent is decomposed by successive addition of 2.5 ml. of acetic ester and 2.5 ml. of water. The reaction mixture is then filtered over a filter aid, washed thoroughly with warm methylene chloride, evaporated, the residue boiled several times with ether, filtered off each time, the filtrates combined and these evaporated. The residue is chromatographed on a 20-fold amount of aluminum oxide yielding 19-ethylidene-androst-4-en-17β-ol-3-one which melts at 145–146° upon crystallization from ether.

EXAMPLE 3

800 mg. of dichlorodicyanobenzoquinone is introduced at room temperature with stirring and flushing with argon into a solution of 1 g. of 19-ethylidene-androst-4-ene-3,17-dione in 40 ml. of dioxane which contains 6.5 percent hydrogen chloride and the mixture then rinsed with 20 ml. of dioxane. The mixture is then stirred for 15 minutes and poured onto a mixture of 300 ml. of ice water and 20 ml. of concentrated sodium hydroxide solution and extracted with ether. The extract is washed and evaporated whereby a partially crystallizing oil is obtained. By crystallization of this oil from ether, there is obtained 19-ethylidene-androsta-4,6-diene-3,17-dione melting at 157–158°.

EXAMPLE 4

166 mg. of dichlorodicyanobenzoquinone is added with stirring to a solution of 200 mg. of 19-ethylidene-androsta-4,6-diene-3,17-dione in 15.2 ml. of dioxane which contains 0.3 percent of concentrated hydrochloric acid. The reaction mixture is then stirred for 18 hours at 60° under an argon atmosphere and poured on ice water. The mixture obtained is saturated with sodium chloride and extracted with ether. The extract is washed and evaporated. The residue thus obtained is dissolved in benzene and is then poured onto an aluminum oxide column. Elution with ethyl acetate and crystallization of the residue obtained upon evaporation of the eluate from ether gives 19-ethylidene-androsta-1,4,6-triene-3,17-dione melting at 187–189°.

EXAMPLE 5

A solution of 1400 mg. of 19-ethylidene-17α-methyl-androst-4-en-3-on-17β-ol and 1195 mg. of dichlorodicyanobenzoquinone in 107 ml. of dioxane which contains 0.13 percent of concentrated hydrochloric acid is stirred at room temperature under a nitrogen atmosphere for 24 hours. The initially orange clear solution changes after about 1½ hours into a turbid mixture and is then poured into ice cold saturated brine. On extraction with ether and evaporation of the washed and dried ethereal solution there is obtained a brown resin which is chromatographed on a 1000-fold amount of silica gel using chloroform.

The combined purified fractions are then recrystallized from ether giving 19-ethylidene-17α-methyl-androsta-1,4-dien-3-on-17β-ol melting at 151–152°.

The starting material can be prepared as follows:

A solution of 2.0 g. of 19-ethylidene-androst-4-ene-3,17-dione in 10 ml. of dimethylformamide is boiled at reflux with slight stirring for 3½ hours with 10 ml. of 2,2-dimethoxy-propane, 52 mg. of p-toluenesulfonic acid and 0.4 ml. of absolute methanol. After cooling, 300 mg. of sodium bicarbonate are added, the reaction mixture is then stirred for 15 minutes, poured into 500 ml. of water and extracted with ether. The washed and dried ether extracts are evaporated to dryness, the residual yellow resin dissolved in 1 ml. of absolute methanol containing 1 percent pyridine and left overnight at −15°. The resultant yellow needles are filtered off by suction and rinsed with as little obsolute methanol as possible. The so-obtained 19-ethylidene-3 - methoxy-androsta-3,5-dien-17-one melts at 118°.

A solution of methyl lithium in absolute ether is prepared in the usual manner by introducing a methyl iodide solution in absolute ether into a suspension of lithium shavings in absolute ether and the content of methyl lithium is determined by decomposition thereof with water and titration of the lithium hydroxide which is set free by means of ⅒ normal hydrochloric acid.

A solution of 1.5 g. of 19-ethylene-3-methoxy-androsta-3,5-dien-17-one in 50 ml. of absolute tetrahydrofuran is added at room temperature and under a nitrogen atmosphere and with stirring to a solution of 780 mg. of methyl lithium in absolute ether and 2.7 ml. of triethylamine. In doing so, the temperature of the reaction mixture rises about 5°. After this addition, the reaction mixture is stirred for a further 2 hours at room temperature, then the excess methyl lithium decomposed by careful dropwise addition of 40 ml. of a saturated ammonium chloride solution and the organic solvent distilled off. The aqueous residue is extracted with ether, the ethereal extract is washed with water, dried and evaporated to dryness.

For the decomposition of the enol ether grouping of the so-formed 19-ethylidene-17α-methyl-3-methoxy-androsta-3,5-dien-17β-ol, the reaction product is dissolved in methanol (25 ml.), 1.1 ml. of water and 1.6 ml. of concentrated hydrochloric acid are then added and the reaction mixture stirred under a nitrogen atmosphere for about 1 hour. The yellow solution is poured into water and extracted with ether. On evaporation of the ethereal solution, chromatography on a 1000-fold amount of silica gel and recrystallization from ether/petroleum ether, there is obtained 19-ethylidene-17α-methyl-androst-4-en-3-on-17β-ol melting at 157–158°.

EXAMPLE 6

760 mg. of dichlorodicyanobenzoquinone is added under an argon atmosphere and with stirring to 1 g. of 19-ethylidene-17α-methyl-androsta - 4-en-3-on-17β-ol in 38.4 ml. of dioxane which contains 6.5 percent hydrogen chloride. The reaction mixture is then rinsed with 15 ml. of dioxane and then stirred at room temperature for 45 minutes. The reaction mixture is poured into 300 ml. of ice water and 20 ml. of conc. sodium hydroxide and taken up in ether. The ethereal extract is washed, dried and evaporated. There is obtained a crystalline product which, after chromatography on a 1000-fold amount of silica gel and crystallization of the eluate from ether, yields 19-ethylidene-17α-methyl-androsta - 4,6-dien - 3-on-17β-ol melting at 171–172°.

EXAMPLE 7

A solution of 3.38 g. of 19-ethylidene-17α-ethynyl-androst-4-en-17β-ol-3-one and 2.76 g. of dichlorodicyanobenzoquinone in 250 ml. of dioxane which contains 0.13 percent of concentrated hydrochloric acid is stirred at room temperature under a nitrogen atmosphere for 24 hours. The reaction mixture is poured into ice cold saturated brine and extracted with ether. The extract is washed, dried and evaporated and the residue is chromatographed on a 1200-fold amount of silica gel. crystallized from ether/petroleum ether (low boiling) yielding 19 - ethylidene - 17α - ethynyl - androsta - 1,4 - dien - 17β-ol-3-one melting at 224–225°.

The starting material can be prepared as follows:

2.34 g. of finely divided potassium are added to 180 ml. of liquid ammonia. After stirring for 10 minutes, acetylene is bubbled into the deep-blue solution and, after about 2 minutes, a solution of 1.02 g. of 19-ethylidene-3-methoxy-androsta-3,5-dien-17-one in 48 ml. of tetrahydrofuran is added dropwise in the course of 8 to 10 minutes while continuing the bubbling in of acetylene. Acetylene is then bubbled into the reaction mixture for a further 24 minutes, the ammonia removed and the residue is taken up in ether. The ethereal extract is washed with brine, dried and evaporated.

For hydrolysis, the crude product containing 19-ethylidene-17α-ethynyl-3-methoxy-androsta-3,5 - dien-17β-ol, is dissolved in 2.12 ml. of hydrochloric acid, 1.48 ml. of water and 90 ml. of absolute methanol and stirred at room temperature for 1½ hours.

There remains a white-yellow foam which, chromatographed on a 60-fold amount of silica gel and recrystallized from ether/petroleum ether (low boiling), yields 19-ethylidene-17α-ethynyl-androst-4-en-3-on-17β-ol melting at 173–175°.

EXAMPLE 8

740 mg. of dichlorodicyanobenzoquinone is added under an argon atmosphere and with stirring at room temperature to a solution of 1 g. of 19-ethylidene-17α-ethynyl-androst-4-en-3-on-17β-ol in 37.2 ml. of dioxane which contains 6.5 percent hydrogen chloride. The reaction mixture is then rinsed with 15 ml. of dioxane. After 45 minutes, the mixture is poured into a mixture of 300 ml. of ice water and 20 ml. of conc. sodium hydroxide solution, saturated with common salt and extracted with ether. The extract is washed, dried and evaporated, and the crude product, already in crystalline form, is obtained, By recrystallization from ether, there is obtained 19-ethylidene-17α-ethynyl-androst-4,6-dien-3-on-17β-ol melting at 210–211°.

EXAMPLE 9

A mixture of 2 g. of 19-ethylidene-17α-methyl-androsta-4,6-dien-3-on-17β-ol and 1580 mg. of dichlorodicyanobenzoquinone in 145 ml. of dioxane which contains 0.3 percent of hydrogen chloride is stirred at room temperature under an argon atmosphere for 70 hours. The mixture is then poured on ice water, saturated with common salt and extracted with ether. For the purification of the crude product obtained by evaporation of the washed and dried ethereal extract it is chromatographed on a 750-fold amount of fine silica gel. The ether fractions are crystallized from ether/petroleum ether and the so-obtained crystals, dissolved in ethyl acetate, are filtered through a little aluminum oxide. 19-ethylidene-17α-methyl-androsta-1,4,6-trien-3-on-17β-ol, melting at 165–167°, is obtained upon crystallization from ether.

EXAMPLE 10

4.66 g. of 19-ethylidene-17α-ethynyl-androsta-4,6-dien-3-on-17β-ol and 3.64 g. of dichlorodicyanobenzoquinone are stirred for 20 hours at 60° in 326 ml. of dioxane which contains 0.3 percent of hydrogen chloride. The mixture is then poured on ice water, saturated with common salt, extracted with ether and, for purification, the crude material is poured onto a 100-fold amount of fine silica gel. Elution with chloroform yields 19-ethylidene-17α-ethynyl-androsta-1,4,6-trien-3-on-17β-ol, melting at 190–192° upon crystallization from ether.

EXAMPLE 11

Employing techniques described in Example 3, 19-ethylidene-androst-4-en-3-on-17β-ol is dehydrogenated to form 19-ethylidene - androsta-4,6-dien-3-on-17β-ol melting at 183–184.5° upon recrystallization from ether.

EXAMPLE 12

A solution of 380 mg. of 19-methylene-17α-methyl-androst-4-en-3-on-17β-ol and 330 mg. of dichlorodicyanobenzoquinone in 15 ml. of dioxane which contains 0.13 percent concentrated hydrochloric acid is stirred at room temperature under a nitrogen atmosphere for 24 hours. 400 mg. of sodium carbonate are then added and the reaction mixture is refluxed for 1 hour. After cooling, the reaction mixture is filtered through 20-fold amount of aluminum oxide (activity II) and rinsed well with ethyl acetate. The crude product so obtained is chromatographed on 100-fold amount of silica gel using cyclohexane-ethyl acetate 3:1. There is obtained pure 19-methylene-17α-methyl-androsta-1,4-dien-3-on-17β-ol melting at 174–175° upon recrystallization from ether/petroleum ether.

The starting material can be prepared as follows:

6.04 g. of 19-methylene-androst-5-ene-3β,17β-diol is dissolved in 500 ml. of toluene and 80 ml. of cyclohexanone. The solution is heated to boiling and 100 ml. of the solvent are distilled off. 10 g. of aluminum tertiary butylate and 30 ml. of cyclohexanone are added to the reaction mixture which is subsequently refluxed for 3 hours. After the addition of 30 ml. of glacial acetic to the cooled reaction mixture, it is submitted to steam distillation. The residue is taken up in ether, the ethereal solution is washed, dried and evaporated. The residue is chromatographed on silica gel using benzene-acetone 4:1 and yields 19-methylene-androst-4-ene-3,17-dione melting at 162–163° upon recrystallization from ethanol. Employing procedures similar to those described in Example 5, 19-methylene-androst-4-ene-3,17-dione is converted to the enol ether and the latter treated with methyl lithium and hydrolyzed. The crude product is chromatographed on 60-fold amount of silica gel yielding pure 19-methylene-17α-methyl-androst-4-en-3-on-17β-ol which melts at 161–162° upon recrystallization from acetone/n-hexane.

EXAMPLE 13

A solution of 3.12 g. of 19-methylene-17α-ethynyl-androst-4-en-3-on-17β-ol and 2.64 g. of dichlorodicyanobenzoquinone in 120 ml. of dioxane containing 0.12 percent concentrated hydrochloric acid is stirred at room temperature under a nitrogen atmosphere for 6 hours. 4 g. of anhydrous sodium carbonate are added and the reaction mixture is heated to reflux for 1 hour. The reaction mixture is filtered, the filtrate is concentrated to a small volume and chromatographed on 20-fold amount of alumina (activity II) using ethyl acetate. The product so obtained is rechromatographed on 50-fold amount of silica gel using cyclohexane/ethyl acetate 3:1. There is obtained pure 19-methylene-17α-ethynyl-androsta-1,4-dien-3-on-17β-ol melting at 234–236° upon recrystallization from acetone/n-hexane.

The starting material, 19-methylene-17α-ethynyl-androst-4-en-3-on-17β-ol can be obtained from 19-methylene-androst-4-en-3,17-dione employing procedures described in Example 7 and melts at 174.5–175.5°.

EXAMPLE 14

(a) Tablet formulation

| | Mg. |
|---|---|
| 19-alkenyl steroid, e.g. 19-ethylidene-17α-methyl-androsta-1,4-dien-3-on-17β-ol | 3 |
| Lactose | 60 |
| Starch | 35 |
| Talc | 1.8 |
| Magnesium stearate | 0.2 |
| Total weight | 100.0 |

(b) Oily suspension for injection
  19-alkenyl steroid, e.g. 19-ethylidene-17α-methyl-androsta-1,4-dien-3-on-17β-ol _____ mg__ 10
  Sterile sesame oil, add _____ ml__ 1000

We claim:

1. A compound of the formula:

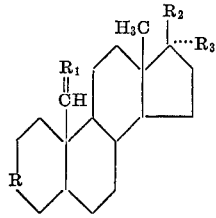

wherein R is a 3-keto-Δ$^{1,4}$-, 3-keto-Δ$^{4,6}$- or 3-keto-Δ$^{1,4,6}$- system; $R_1$ is lower alkylidene; $R_2$ is hydroxy, a hydrocarbon carboxylic acyloxy group of less than 10 carbon atoms, lower alkoxy or tetrahydropyranyloxy; $R_3$ is hydrogen, lower alkyl, lower alkenyl, or lower alkynyl; or $R_2$ and $R_3$ together are oxo.

2. A compound as in claim 1 which is 19-ethylidene-androsta-1,4-dien-3-on-17β-ol.

3. A compound as in claim 1 which is 19-ethylidene-androsta-4,6-diene-3,17-dione.

4. A compound as in claim 1 which is 19-ethylidene-17α-methyl-androsta-4,6-dien-3-on-17β-ol.

5. A compound as in claim 1 which is 19-ethylidene-17α-ethynyl-androsta-4,6-dien-3-on-17β-ol.

6. A compound as in claim 1 which is 19-ethylidene-androsta-1,4,6-triene-3,17-dione.

7. A compound as in claim 1 which is 19-ethylidene-17α-methyl-androsta-1,4,6-trien-3-on-17β-ol.

8. A compound as in claim 1 which is 19-ethylidene-17α-ethynyl-androsta-1,4,6-trien-3-on-17β-ol.

9. A compound as in claim 1 which is 19-ethylidene-androsta-4,6-dien-3-on-17β-ol.

10. A compound as in claim 1 which is 19-methylene-17α-methyl-androsta-1,4-dien-3-on-17β-ol.

11. A compound as in claim 1 which is 19-methylene-17α-ethynyl-androsta-1,4-dien-3-on-17β-ol.

12. A compound as in claim 1 of the formula:

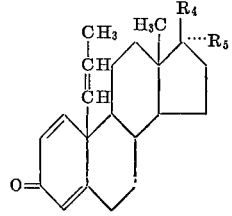

wherein $R_4$ is hydroxy; $R_5$ is lower alkyl, lower alkenyl or lower alkynyl; or $R_4$ and $R_5$ together are oxo.

13. A compound as in claim 12 which is 19-ethylidene-androsta-1,4-diene-3,17-dione.

14. A compound as in claim 12 which is 19-ethylidene-17α-methyl-androsta-1,4-dien-3-on-17β-ol.

15. A compound as in claim 12 which is 19-ethylidene-17α-ethynyl-androsta-1,4-dien-3-on-17β-ol.

References Cited

UNITED STATES PATENTS

| 3,102,127 | 8/1963 | Bowers | 260—397.4 |
| 3,207,767 | 9/1965 | Bowers | 260—397.4 |
| 3,309,387 | 3/1967 | Furst et al. | 260—397.5 |

ELBERT L. ROBERTS, Primary Examiner

U.S. Cl. X.R.

260—239.55, 397.4, 397.5; 424—242, 243